C. JELLINEK.
MOLDING.
APPLICATION FILED APR. 1, 1914.
1,137,489.
Patented Apr. 27, 1915.
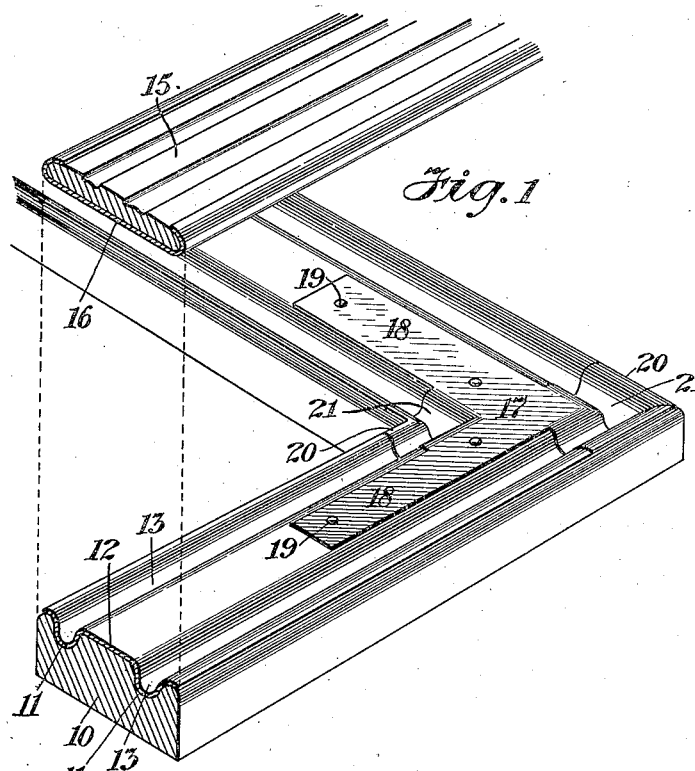
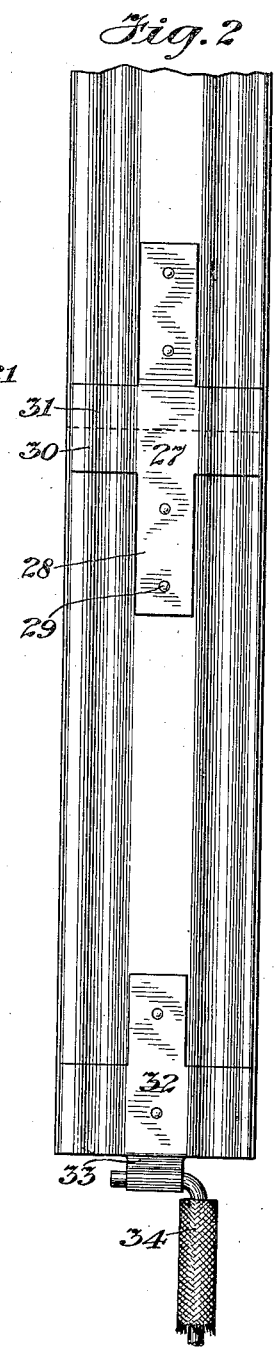
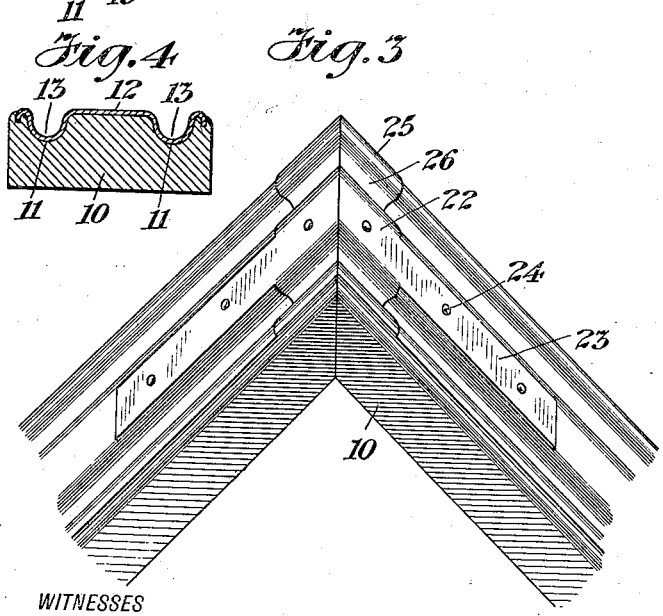
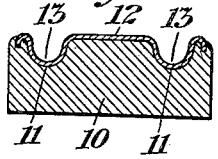
WITNESSES
Chas. F. Clagett
Bertha M. Allen.
INVENTOR
Charles Jellinek
BY
HIS ATTORNEYS

UNITED STATES PATENT OFFICE.

CHARLES JELLINEK, OF NEW YORK, N. Y., ASSIGNOR OF ONE-THIRD TO SAID JELLINEK, ONE-THIRD TO DAVID STERN, AND ONE-THIRD TO DAVID WALD, ALL OF NEW YORK, N. Y.

MOLDING.

1,137,489.

Specification of Letters Patent.

Patented Apr. 27, 1915.

Application filed April 1, 1914. Serial No. 828,725.

*To all whom it may concern:*

Be it known that I, CHARLES JELLINEK, a citizen of the United States, residing at the borough of Manhattan, in the city, county, and State of New York, have invented an Improvement in Moldings, of which the following is a specification.

Heretofore it has been customary, in running electric circuit wires on the exterior of walls, as well as similar places, for the purpose of electric lighting, or otherwise, to employ a wooden molding, in which there are grooves or conduits to receive the circuit wires. Comparatively recently, however, the use of such wooden molding has been prohibited, and now, to comply with the generally universal building requirements, especially in larger cities, it is necessary to use a metal molding or conduit for electric circuit wires for lighting and other similar purposes, in order to lessen and eliminate, as far as possible, the fire risk, due to short circuits, it being understood that the metallic molding is required to be suitably grounded, in order to carry any stray currents to earth.

I am aware that various forms of metallic moldings have been made and used, but all of them are, I believe, necessarily expensive, as compared with the old form of wooden molding.

Now, the object of my present invention is the provision of a comparatively inexpensive molding which will meet all the requirements of the underwriters and various municipal building departments relating to a metallic conduit for electric circuit wires.

In carrying out my present invention, I preferably employ the ordinary form of wooden molding, fitting the same with a metallic facing, provided with a metallic lined cover, so that when the parts are placed together they form a complete metallic conduit for the reception of electric circuit wires. I also employ the necessary bond members for connecting the otherwise separated metallic parts of the molding, made in accordance with my invention, so that the molding may be suitably grounded like a completely metallic conduit.

In the drawing, Figure 1 is a perspective view partially in cross section, illustrating an angle made of molding constructed in accordance with my present invention. Fig. 2 is a plan view of adjacent sections of molding, Fig. 3 is a perspective view showing the construction of the molding made for running conduits on exterior surfaces, and Fig. 4 is a cross section illustrating one manner in which the metallic facing may be secured to the base of the molding.

Referring to the drawing, and particularly to Fig. 1, the molding made in accordance with my present invention comprises a base 10, made of wood or similar material, in strips of suitable lengths and provided, as is customary, in such molding, with longitudinal grooves 11 in one surface thereof. Together with this base, I also employ a facing 12 made of sheet metal, formed with grooves 13 adapted to fit and lie within the grooves 11 in the face of the base 10, the opposite edges of the metallic facing 12 being inturned and set into grooves provided therefor in the opposite edges of the base 10, as shown in Fig. 4. Together with each strip of molding so constructed, I employ a cover, indicated at 15. This is also made of wood, or any similar material, and on one side thereof is provided with a metal face 16. In the use of these parts the metal face 16 and the metallic facing 12 are placed together, after the circuit wires have been put in position, and the cover is secured to the base by means of suitable screws, nails, or other similar devices.

As will also be seen in Fig. 1, in which a one surface corner of molding is illustrated, I employ a bond member, indicated at 17. This is made of metal and comprises tongues 18 and 19, at right angles to each other, adapted to lie against the surface of the metallic lining between the grooves in the molding and to be secured thereto by screws or nails 19 or otherwise. At the corners this bond member is provided with ears 20, in which there are grooves 21, which, as will be understood, extend over the edges of the metallic facing at the ends of the strips of molding, where the joint is made, at which place these edges, because of being cut to form the joint, may be more or less rough and thus apt to break or injure the insulation on the circuit wires, these grooved ears 20 covering the rough edges of the metallic face, so as to prevent any possible injury to the insulation of the wires. A similar bond member is shown in Fig. 3, for use in running circuit wires on the exterior of walls and ceilings or floors. This bond member, as indicated at 22, is provided with tongues 23, which are secured to the metallic facing of the molding by means of screws or nails 24, and at the angle or bend this bond member is provided with ears 25 having grooves 26 fitting into the grooved portions of the adjacent members of the molding. Also as indicated in Fig. 2, the bond member employed in the use of my improved molding may comprise a flat strip of metal, as indicated at 27, the opposite parts of which form tongues 28, and may be secured to the metallic facing of adjacent strips of metal by means of screws or nails 29. This bond member is also centrally provided with ears 30, in which there are grooves 31, adapted to be fitted into the grooves in the adjacent sections of the molding and covering the rough edges thereof in the same manner as the similar parts of the other forms of bond members hereinbefore described are designed to do.

By reference to Fig. 2, it will also be seen that I may employ a terminal member 32, provided with a contact 33 adapted to receive one end of a wire 34, by means of which the molding may be suitably connected to the ground.

It will also be understood that my invention is not limited to the precise form of molding hereinbefore described and illustrated in the drawing, nor to the particular forms of bond members as described in connection therewith, as other forms of molding and bond members may be employed, coming within the terms of the claims, without departing from the nature and spirit of my invention.

I claim as my invention:

1. A molding for electric wiring, comprising a wooden base having grooves in one face thereof, a metallic facing having grooves therein fitting into the grooves in the said base and secured at its opposite edges in the adjacent parts of the said base, and a bond member for connecting together electrically adjacent sections of the molding.

2. A molding for electric wiring, comprising a wooden base having grooves therein, a metallic facing also having grooves therein adapted to fit within the grooves in the said base and secured at opposite edges to the adjacent parts of the said base, a bond member having tongues for connecting the same to the metallic facing of adjacent sections of the said molding, and grooved ears fitting into the grooves thereof to cover the edges of the metallic facing at the joints between the sections.

Signed by me this 24th day of March, 1914.

CHARLES JELLINEK.

Witnesses:
 BERTHA M. ALLEN,
 J. B. LE BLANC.